United States Patent [19]

Wilson et al.

[11] Patent Number: 4,625,754
[45] Date of Patent: Dec. 2, 1986

[54] VALVE BONNET CLOSURE

[76] Inventors: George L. Wilson, 16639 Ben Ledi; John B. Goss, Sr, , 4790 Whispering Falls, both of Houston, Tex. 77084

[21] Appl. No.: 769,131

[22] Filed: Aug. 26, 1985

[51] Int. Cl.$^4$ .................... F16K 43/00; F16K 51/00
[52] U.S. Cl. ................................. 137/315; 220/316; 220/319; 220/367
[58] Field of Search ............... 137/315; 251/327, 328, 251/329; 220/316, 319, 367

[56] References Cited

U.S. PATENT DOCUMENTS

| | | | |
|---|---|---|---|
| 2,616,587 | 11/1952 | Petch | 220/319 |
| 2,725,252 | 11/1955 | Greer | 220/319 |
| 2,904,306 | 9/1959 | Bryant | 251/329 |
| 2,950,897 | 8/1960 | Bryant | 251/328 |
| 3,060,964 | 10/1962 | Bagwell | 251/327 |
| 3,134,396 | 5/1964 | Bredtschneider | 137/315 |
| 3,179,372 | 4/1965 | Vaudreuil | 251/328 |
| 3,314,442 | 4/1967 | Volpin | 251/329 |
| 3,557,822 | 1/1971 | Chronister | 251/329 |

FOREIGN PATENT DOCUMENTS 1425621 11/1968 Fed. Rep. of Germany ...... 251/328

Primary Examiner—George L. Walton
Attorney, Agent, or Firm—Pravel, Gambrell, Hewitt & Kimball

[57] ABSTRACT

A gate valve bonnet closure which can be quickly and safely serviced with common tools. The valve bonnet fits within the valve body. Lock elements in contact with the bonnet fit into an annular groove in the body. The lock elements are of a size and configuration so as to allow location within the groove for substantially the full extent of the annular groove or, spaces between adjacent lock elements can be filled by retaining plates preferably bolted to the bonnet to prevent movement of the lock elements. Pressure sensing vents or bolts are preferably used to prevent opening of the valve when there is pressure in the valve body. The pressure sensing bolts holding retaining plates in place include a hollow bore which is sealed when the bolt is fully seated but is exposed when the bolt is rotated a small number of times to indicate and bleed off pressure within the valve. A seal located in a between the valve body and the bonnet is accessible upon removal of the lock elements to allow servicing or replacement of the seal without removal of the valve gate and bonnet. A fitting to inject sealing material is included to seal minor leaks if necessary.

27 Claims, 10 Drawing Figures

U.S. Patent   Dec. 2, 1986   Sheet 1 of 3   4,625,754
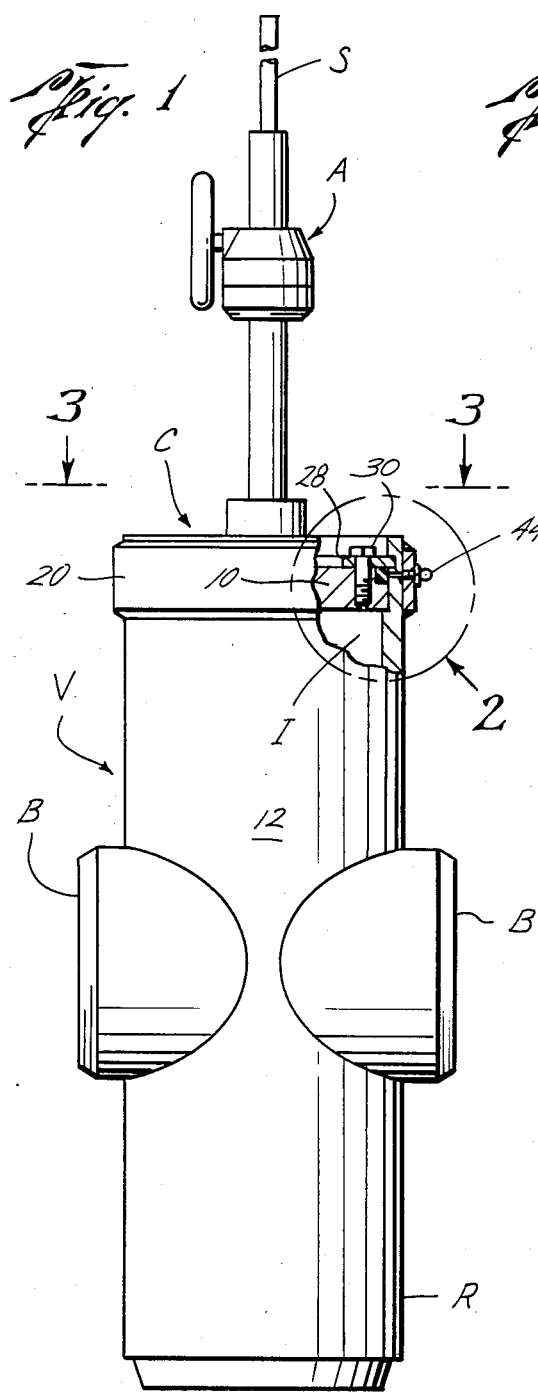
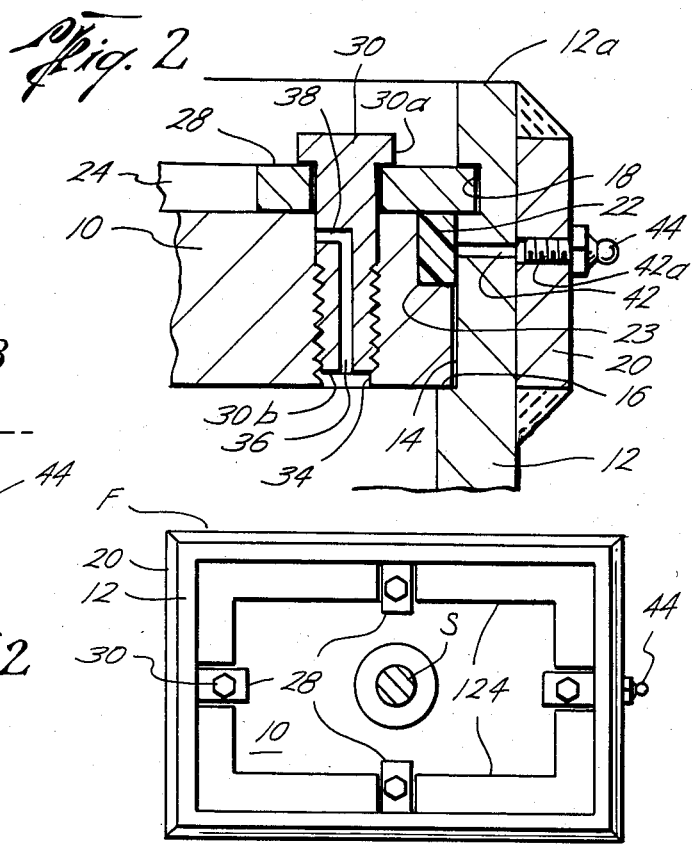
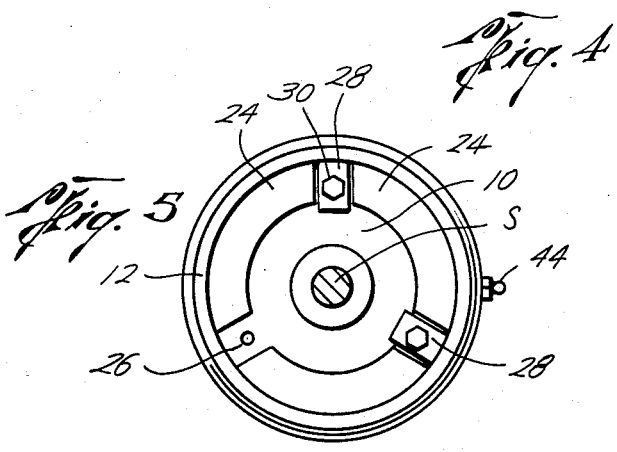
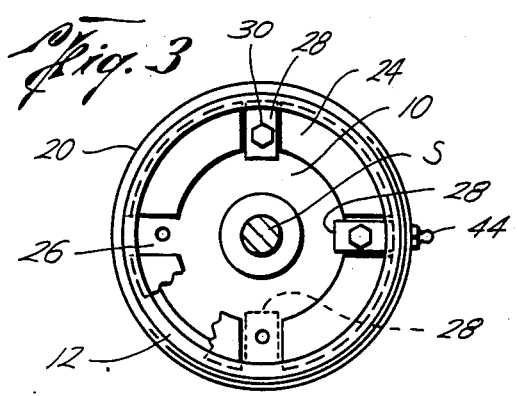
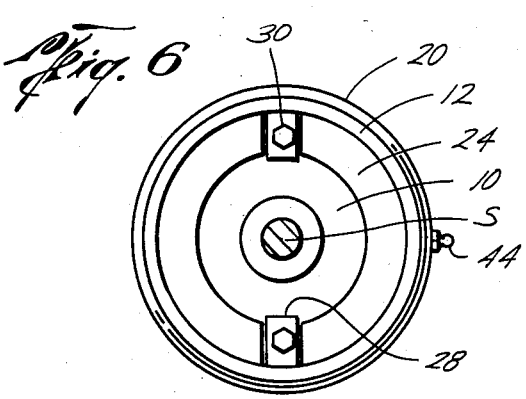

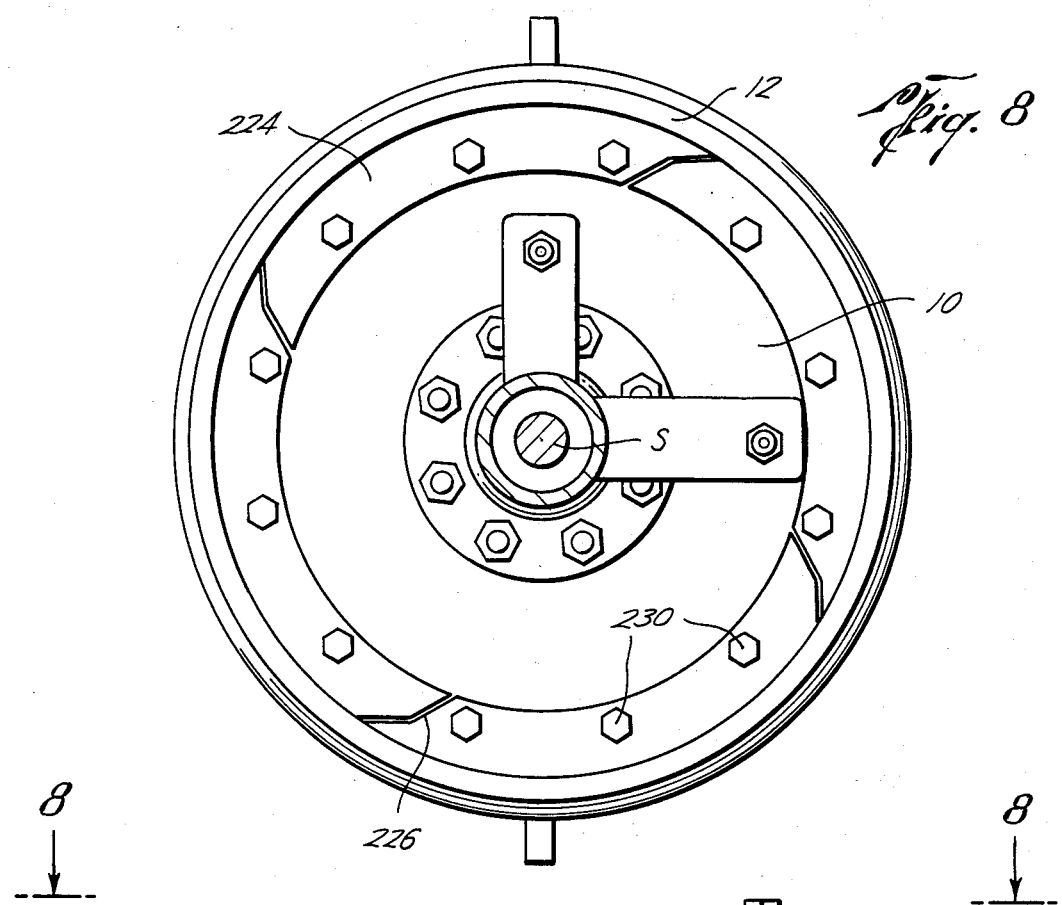
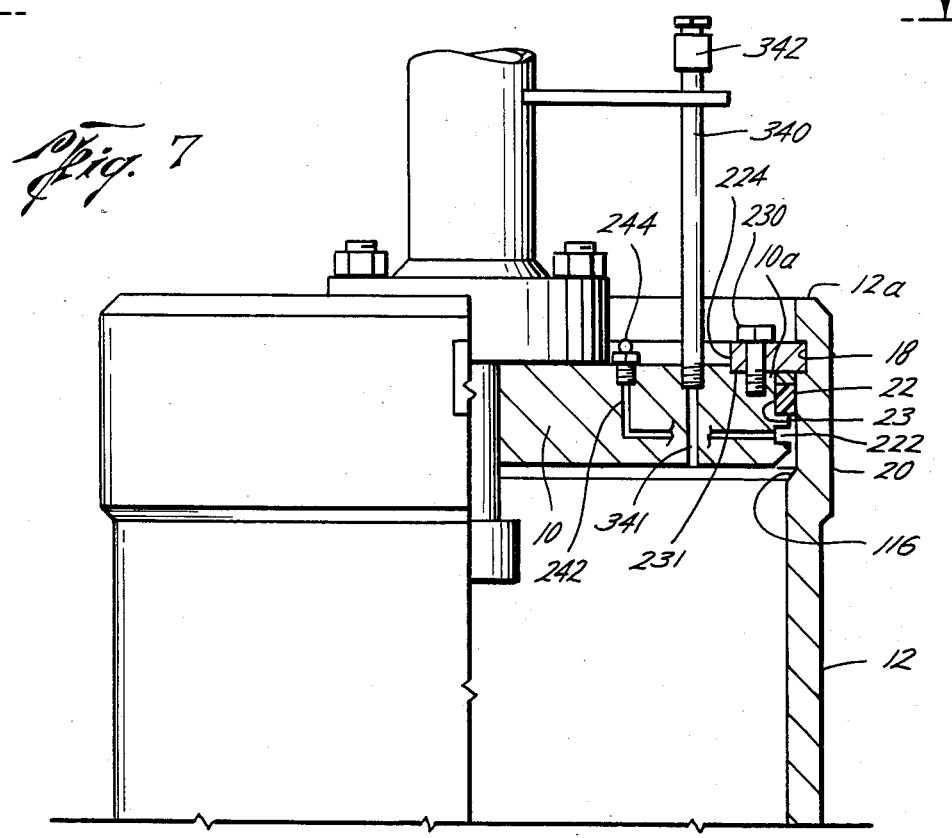

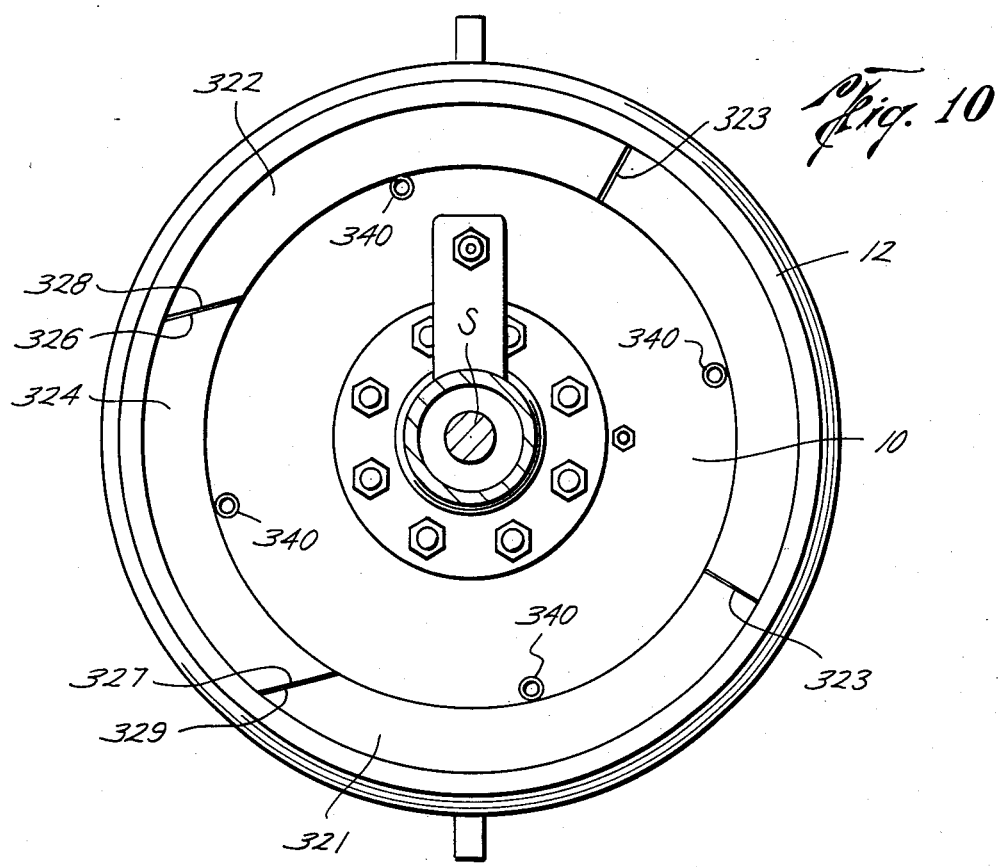
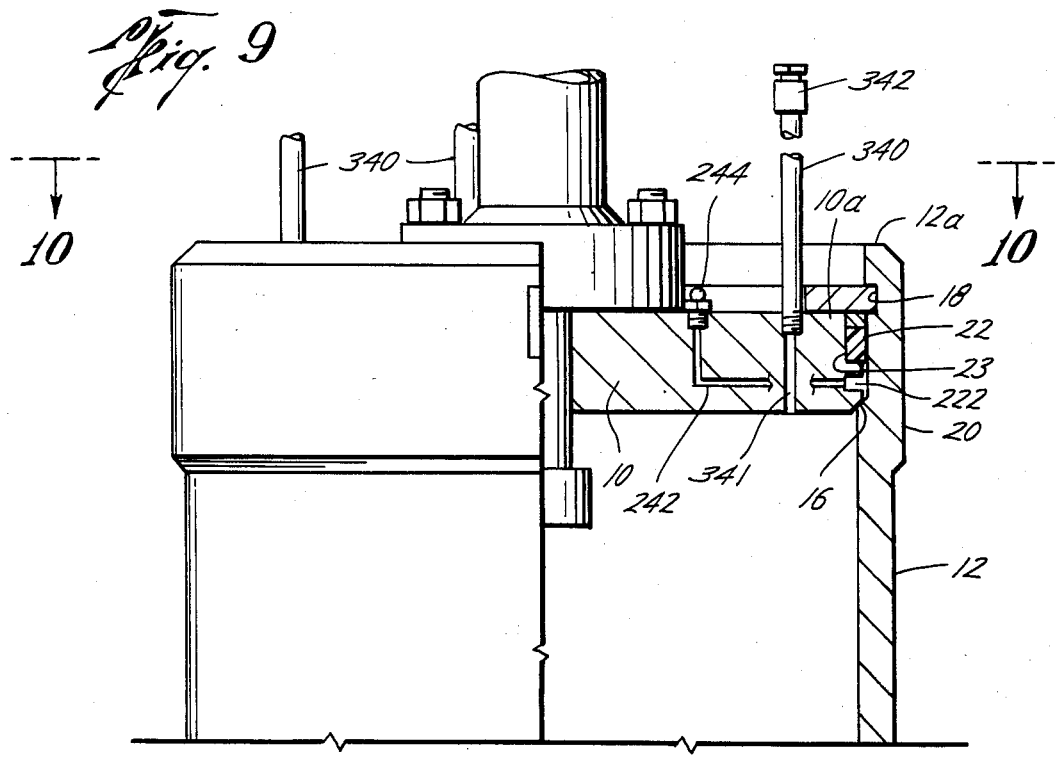

VALVE BONNET CLOSURE

FIELD OF THE INVENTION

The present invention relates to closures for gate valves having removable bonnets for convenient top entry access.

BACKGROUND OF THE INVENTION

Movable gate type valves have been used to control the flow of liquids for many years. In modern industrial plants, gate valves are employed most often where on-off control as opposed to variable flow control is required. In large diameter high flow rate or high pressure pipelines gate valves provide for a through conduit having an unobstructed bore which allows smoother, less turbulent flow. Further, pipeline tools such as pigs, scrapers and balls pass easily through such valves.

Gate valves often include a top entry access to allow replacement or service without removal of the valve body from the pipeline. Such gate valves with a flat body or round body typically employ a removable bonnet retained to the valve body by a large number of bolts. To ensure a positive seal under variable pressure and temperature conditions, precision machining of the mating surfaces between valve body and bonnet is required. A seal such as an O-ring seal is often employed. The large number of sealing bolts must be equally torqued to ensure positive sealing under varying pressure and temperature conditions. The O-ring seals are highly susceptible to localized failure if consistent sealing pressure is not maintained.

The servicing of such gate valves is a time consuming and often dangerous process. If the valve body is not completely depressurized before removal of the sealing bolts, the bonnet can blow free after part of the sealing bolts are removed. The large number of bolts and the critical nature of the applied sealing torque results in a disassembly and re-assembly process which is time consuming and requires specialized tools. During re-assembly, the torque of each of the many sealing bolts must be equalized which requires the use of specialized tools to measure torque and bolt elongation to provide a reliable leak resistant seal under variable pressure and temperature conditions. The use of O-ring type seals further requires the removal of the many sealing bolts and the use of a crane to remove the bonnet with related gate and gate control mechanisms to service or replace the O-ring.

SUMMARY OF THE INVENTION

In accordance with the present invention, a removable top access bonnet on a gate valve body is provided which is quickly and safely serviced with common tools. The seal is highly resistant to blowout and can be quickly replaced or repaired without removal of the valve bonnet. The removable bonnet of the present invention is adapted to fit within the valve body. The valve bonnet can be oriented within the valve body by being bolted to lock elements or may rest upon a shoulder within the valve body. The shoulder can be formed in the valve body by machining the interior surface of the valve body or by fixing a ring to the interior surface of the valve body by welding or the like. The shoulder can provide a locating seat for the valve bonnet or be located so as to hold the bonnet in a position where bolts from the lock elements can be inserted. Machined or cast into the interior of the valve body is a groove positioned between the shoulder and top of the valve body. The groove is located above the shoulder at least a distance corresponding to the thickness of the bonnet.

The bonnet is retained in the valve body by placing a number of lock elements thereon which extend into the groove. The lock elements are of a size and configuration such that upon location in the groove a complete or substantially complete retaining ring is created. The lock elements can be arcuate segments with the spaces between adjacent lock elements filled by retainer plates which are bolted to the bonnet. The lock elements can also be arcuate segments with radial contact between adjacent segments with one segment having parallel contact edges for contact with parallel edges on adjacent segments. The lock element contact edges can be complementary arcuate segments which allow pivotal insertion of the lock elements. A seal is provided in a recess on the upper edge of the bonnet between the valve body, the bonnet and the lock elements.

The bolt or bolts used to fasten the retaining plate or plates, or the lock elements to the bonnet can include a hollow bore which is normally closed off when the bolt is fully seated, but is exposed to the atmosphere when the bolt is rotated a predetermined amount. The hollow bore is in communication through the bolt and the valve bonnet with the valve interior. Therefore, when the bolt is released a small amount to open the bore to the atmosphere, if there is residual pressure within the valve, it will bleed off such pressure before any lock segments or retaining plates are removed. As an alternative, removable vent tubes extending through the bonnet can be adjacent the lock elements as a pressure release means. The bolt or bolts are merely to hold the retaining plates or lock elements in position and applied torque to the bolt or bolts is not critical for proper sealing.

Thus a gate valve bonnet retaining means is provided which requires no specialized tools for assembly, does not required precision machining of the contact surfaces, can quickly and safely be disassembled with oridinary hand tools and which includes a seal which can be replaced without removal of the bonet and gate assembly from the valve body.

BRIEF DESCRIPTION OF THE DRAWINGS

FIG. 1 is a cross-sectional view of the bonnet closure of the present invention.

FIG. 2 is an enlarged cross-sectional view of area 2 of FIG. 1.

FIG. 3 is a top view along line 3—3 of FIG. 1.

FIG. 4 is a top view of a flat body gate valve showing the bonnet closure of the present invention.

FIG. 5 is a top view of a round body gate valve showing an alternate embodiment of the present invention.

FIG. 6 is a top view of a round body gate valve showing an alternate embodiment of the present invention.

FIG. 7 is a cross-sectional view of the bonnet closure showing an alternate embodiment of the present invention.

FIG. 8 is a top view along line 8—8 of FIG. 7.

FIG. 9 is a cross-sectional view of the bonnet closure showing an alternate embodiment of the present invention.

FIG. 10 is a top view along line 10—10 of FIG. 9.

DESCRIPTION OF THE PREFERRED EMBODIMENT

The valve V of the present invention provides a removable bonnet closure for a gate type valve V. The valve can be of the round body R, FIG. 1, or of a square or rectangular body F, FIG. 4. The gate valve body includes inlet/outlet openings or flanges B. The movable gate (not shown) within the valve body R is controlled by an actuator A which can be either mechanical as shown in FIG. 1 or automatic such as electrical, hydraulic or pneumatic (not shown). The actuator A controls the movement of stem S which extends through the valve closure C and is fixed to the usual gate (not shown) within the valve body R.

The stem S extends through the bonnet 10 which is releasably secured to valve body 12 to allow removal and access to the interior of valve body 12 through access opening 14 in the top 12a of valve body 12.

Opening 14 in valve body 12 includes circumferential shoulder 16 formed on the interior thereof. The shoulder 16 is preferably machined or cast into the surface of valve body 12. However, shoulder 16 can be created by a ring welded or otherwise affixed to the interior of valve body 12.

Bonnet 10 is adapted to fit within the valve body 12 and rest upon shoulder 16 (FIG. 2) or be supported above shoulder 116 (FIG. 7) as more fully described below. Machined or cast into valve body 12 between shoulder 16 and top 12a of valve body 12 is a groove 18. Groove 18 is spaced a distance above shoulder 16 or 116 equal to or greater than the thickness of bonnet 10.

A support ring 20 is preferably rigidly affixed by welding or the like to the exterior of the valve body 12 adjacent to the shoulder 16 and groove 18. The support ring 20 provides additional strength and support for the area of the valve body where material has been removed by machining or is thinner due to casting of the shoulder 16 and groove 18. As an alternative, the support ring 20 may be formed as an integral part of the valve body 12 during casting or forging.

An annular resilient seal 22 is located in an annular recess 23 in the top edge 10a of bonnet 10. The seal 22 is preferably formed of rubber, plastic or other deformable elastic material. Because the seal 22 is located in recess 23 in the top edge 10a of bonnet 10 it is accessible without removing bonnet 10 and stem S assembly from the valve body R. The location of seal 22 adjacent lock elements 24, 224, or 324 described below, avoid the necessity of a close tolerance fit between bonnet 10 and valve body 12.

Resting upon bonnet 10 and extending into groove 18 are arcuate lock elements 24. There are preferably four locking elements. The lock elements 24 rest upon bonnet 10 and slidably fit into groove 18. The lock elements are of a size and configuration such that upon location in groove 18 a lock structure around the periphery of the valve body R is created. Each lock element 24 can be of a length less than a 90° arc so as to leave a radial space 26 between adjacent lock elements. Retainer plates 28 of rectangular shape are adapted to fit within and substantially fill the radial spaces 26 thereby locking lock elements 24 in a position within groove 18. Each retainer plate 28 is held in position by a bolt 30 which extends through an opening 32 in retainer plate 28 and is threadedly attached to a threaded bore 34 extending through bonnet 10. Retainer plates 28 preferably slidably fit into groove 18 (FIGS. 3-6).

Alternatively, lock elements 224 can include substantially arcuate ends 226 such that a complete lock structure can be obtained without the use of retainer plates 28. FIG. 8 shows an embodiment where substantially arcuate ends 226 on lock elements 224 allow a pivotal insertion of lock elements 224 into groove 18 creating a complete lock structure within groove 18. The lock elements 224 are retained by bolts 230 extending into the valve bonnet 10. The lock elements 224 can rest upon the bonnet 10 when bonnet 10 rests directly upon shoulder 16 (FIGS. 2 and 9). When bonnet 10 is supported above shoulder 16 by retaining bolts 230 (FIG. 7), bonnet 10 can include a groove 231 to receive the lock elements 224 as bolts 230 are tightened. With the embodiment of FIG. 7, lock elements 224 cannot be removed until pressure within valve body R is released to allow bonnet 10 to drop to a position resting upon shoulder 116 when bolts 230 are released whereby lock elements 224 can be removed from groove 231.

FIG. 10 shows an alternate embodiment wherein one lock element 324 has ends 326 and which are parallel as are the contacting ends 328 and 329 of the adjacent lock elements 321 and 322. The remaining contacts 323 between lock elements are radial such that a complete lock structure can be formed within groove 18. As shown in FIG. 10, the lock elements can be retained in position by removable vent tubes 340 adjacent the lock elements which extend into valve bonnet 10.

The valve bonnet closure is provided with an internal pressure indicating safety feature to allow the indication of and bleeding off of residual pressure within the valve body prior to removal of the lock elements. The pressure indicator can be incorporated into bolts with each bolt 30 including an axial bore 36 which extends from the foot 30b of the bolt to a radial hole 38. The passageway through bolt 30 provided for by bore 36 and hole 38 provides for atmospheric communication with the interior I of valve body R when bolt 30 is rotated a predetermined amount, usually only a small number of turns which is sufficient to move the hole 38 above its sealing engagement with the upper smooth portion of the bore 34. Since the opening 32 is slightly larger than the bolt at the hole 38, the hole is opened to the atmosphere as soon as it is moved above the bore 34. This provides an immediate indication of any residual pressure within valve body R and allows the user to either close the hole 38 by returning the bolt 30 to it seated position, or to bleed off such pressure before any of the lock elements 24 or retaining plates 28 are removed (FIG. 2).

Alternatively, a separate vent tube 340 can be fixed to valve bonnet 10 by a threaded attachment to a bore 341 extending through valve bonnet 10. Such vent tube 340 can include a fitting 342 to be attached to a drain line (not shown) to vent the valve body to a drain or container rather than the atmosphere (FIGS. 7 and 8). The vent tube 340 can be located on valve bonnet 10 adjacent the lock elements 322 to retain the lock elements without the use of retaining bolts (FIGS. 9 and 10).

Extending radially through support ring 20 and valve body 12 in communication with seal 22 is a passageway 42. Threaded or otherwise affixed to the exterior opening 42a of passageway 42 is a self-sealing fitting 44 which allows the injection of a sealing material into the area of the seal 22 if minor leaks develop or during initial assembly to provide a leak resistant seal (FIG. 2). As an alternative, a self sealing fitting 244 can be located on valve bonnet 10 in communication with a passageway 242 extending to an area 222 just below seal 22 (FIG. 7).

Seal 22 is located between the valve body 12, the bonnet 10 and the lock elements 24. There are no precision machined surfaces needed and seal 22 whether an O-ring, packing or other sealing means is accessible by removing retaining plate 28 and lock elements 24, 224, o4 324. There is no need to remove the bonnet 10 with the stem and gate assembly from the valve body 12 to service the seal 22. Further, if during use a minor leak develops, additional sealant may be injected through fitting 44, of 244 without removing any bolts, retaining plates or locking elements.

During assembly of the gate valve V, bonnet 10 is fitted into valve body 12 to a position resting upon shoulder 16. The stem S is thus also positioned with the bonnet in its normal operating position. The seal 22 is placed within the recess 23 on the top edge 10a of bonnet 10. Lock elements 24 are placed upon bonnet 10 and pushed radially into groove 18 but leaving radial spaces 26 between adjacent lock elements. Retaining plates 28 are then positioned in the radial spaces 26 to fill such spaces. When those spaces 26 are all filled by the plates, 28, the elements 24 cannot move radially out of the groove 18. The plates 28 are held in position by bolts 30 and they may also extend into the groove 18, although that is not necessary because they are not relied upon to hold the bonnet 10 from moving upwardly, except to the extent that they retain the lock elements 24 in place. Thus, normally the retention of the bonnet 10 in place is by the lock elements 24. With the embodiment as shown in FIGS. 7 and 8 upon location in valve body R, valve bonnet 10 rests upon the shoulder 16 lock elements are fitted into groove 18 and bolts 30 inserted. Upon tightening of bolts 30, valve bonnet 10 is lifted off shoulder 16 and supported by bolts 30 and the pressure within valve body R. The bolts 30 do not provide clamping force between sealing surfaces as in the prior art and therefore the applied torque to the bolts is not critical to achieve a proper seal of the bonnet 10.

Disassembly is the reverse. However, servicing of the seal 22 merely requires the removal of bolts 30, retaining plates 28 and lock elements 24 (FIG. 2); bolts 230 and the lock elements 224 (FIGS. 7 and 8) or vent tubes 340 and lock elements 324 (FIGS. 9 and 10). Removal of bonnet 10 and the attached gate and stem S assembly is not necessary in order to access and service seal 22.

The bolt design includes a passageway which provides a measure of safety by indicating the presence of pressure within the valve body 12 by merely rotating a bolt a predetermined amount usually only a small number of turns (FIG. 2). Alternatively, a vent tube 340 can be fitted to valve bonnet 10. Thus, before any of the retaining plates 28, or lock elements 24, 224 or 324 are removed, the presence of pressure within the valve is indicated and may be allowed to bleed off thereby avoiding the possibility of a bonnet blow off. The valve closure C has been described as including four lock elements and retaining plates. However, any number may be employed. FIG. 5 shows an embodiment of the present invention having three lock elements and retainer plates. FIG. 6 shows an embodiment of the present invention having two retainer plates and lock elements.

Also, although the invention has been described above with a round or cylindrical valve body, the shape may be modified such as shown in FIG. 4. The lock elements 124 are made to fit in a recess such as recess 18 shown in FIG. 2, leaving spaces for retainers 28, so that when the retainers 28 are in position, as seen in FIG. 4, the elements 124 cannot be moved out of the recess 18. This assures that there can be no inadvertent release of the bonnet 110 in FIG. 4, just as is the case with the bonnet 10 in the other forms of the invention.

The valve bonnet closure of the present invention provides for sealing with fewer and lighter bolts which are not required to be critically torqued. The valve bonnet is small and light weight and the seal can be replaced without its removal. Residual pressure indication means is provided to avoid the dangers of valve bonnet removal when the valve body is pressurized.

It should be understood that the foregoing description and drawings of the invention are not intended to be limiting, but are only exemplary of the inventive features which are defined in the claims.

We claim:

1. A valve having a removable bonnet closure which comprises:
    a valve body including an access opening to receive a bonnet closure;
    an annular groove in said valve body adjacent the access opening;
    a bonnet closure adapted to fit within the access opening contacting a shoulder on said valve body leaving said groove exposed;
    a plurality of lock elements adapted to contact said bonnet closure and fit within said groove to prevent removal of said bonnet closure from said valve body;
    seal means in sealing contact with said valve body, said bonnet closure and said lock elements to confine the seal means to prevent extrusion thereof without requiring close machining tolerances.

2. The valve of claim 1, further including means to retain said lock elements in said groove to thereby lock said bonnet closure in said access opening.

3. The valve of claim 2, wherein said means to retain said lock elements comprises:
    lock elements having a concave and a convex arcuate end contact surfaces are retained to said valve bonnet closure by bolts wherein said arcuate end surfaces allow location of said segments in said groove substantially extending for the full extent of said annular groove.

4. The valve of claim 2, wherein said means to retain said lock elements comprises at least one lock element having end surfaces to contact adjacent lock elements which are substantially parallel which allow location of said lock elements in said groove substantially extending for the full extent of said annular groove.

5. The valve of claim 1, further including support for said valve body adjacent said groove comprising a valve body wall thickness adjacent said groove and said access opening substantially the same as the thickness of the remainder of said valve body.

6. The valve of claim 1, further including a fitting extending through said valve body to said seal means to allow the injection of a pliable sealing material.

7. The valve of claim 1, further including a fitting extending through said bonnet to a point adjacent said seal means to allow the injection of a pliable sealing material.

8. The valve of claim 1, wherein said bonnet closure includes a circumferential groove to receive said lock elements.

9. The valve of claim 1, wherein said seal means comprises packing material between said bonnet closure and said valve body.

10. The valve of claim 1, wherein said means to retain said lock elements comprises four retainer plates fitted in radial spaces formed between adjacent lock elements for retaining said lock elements in said groove.

11. The valve of claim 9, wherein said retainer plates are retained in said groove by bolts extending into said bonnet.

12. The valve of claim 11, wherein said threaded bolts retain said retainer plates to said bonnet through said closure head and include axial hollow passageways extending from the foot of said bolts to intersect radial hollow passageways adjacent the head of said bolts whereby upon minimal rotation of said bolts said radial hollow passageways become exposed to the atmosphere whereby pressure within said valve body will be released to the atmosphere.

13. The valve of claim 1, wherein said means to retain said lock elements comprises at least one lock element having end surfaces to contact adjacent lock elements which converge in a radially outward direction which allow location of said lock elements in said groove substantially extending for the full extent of said annular groove.

14. The valve of claim 4 or 13, whereby said lock elements are retained by vent tubes releasably secured to said bonnet adjacent said lock elements.

15. A removable bonnet gate valve which allows access to the interior of the valve body wherein the improvement comprises:
 a shoulder formed on the interior of the valve body adjacent the access opening to support a bonnet closure;
 an annular groove in said valve body between said shoulder and the access opening;
 a bonnet closure adapted to fit within the access opening and rest upon said shoulder leaving said groove exposed;
 at least three lock elements adapted to contact said bonnet closure and fit within said groove; leaving radial spaces between the ends of adjacent lock elements;
 retaining plates corresponding to the number of radial spaces adapted to fit within said radial spaces and be releasably secured therein to retain said lock elements in said groove thereby sealing said access opening; and
 seal means between said body, said bonnet closure and said lock element segments.

16. The valve of claim 15, further including support for said valve body adjacent said shoulder and said groove comprising valve body wall thickness adjacent said shoulder and said groove substantially the same as the thickness of the remainder of said valve body.

17. The valve of claim 15, further including a fitting extending through said valve body to said seal means to allow the injection of sealing material.

18. The valve of claim 15, wherein said seal means comprises packing material between said bonnet closure and said valve body.

19. The valve of claim 15, wherein said retaining plates are removably affixed to said bonnet closure with threaded bolts.

20. The valve of claim 19, wherein said threaded bolts extend through said bonnet closure and include an axial hollow passageway extending from the foot of said bolt to intersect a radial hollow passageway adjacent the head of said bolt whereby upon minimal rotation of said bolt said radial hollow passageway becomes exposed to the atmosphere whereby pressure within said valve body will be released to the atmosphere.

21. A removable bonnet gate valve which allows access to the interior of the valve body wherein the improvement comprises:
 a valve body including an access opening to receive a bonnet closure;
 an annular groove in said valve body adjacent the access opening;
 a bonnet closure adapted to fit within the access opening leaving said groove exposed;
 a plurality of lock elements adapted to fit within and substantially extend for the full extent of said annular groove;
 means in combination with said bonnet closure to retain said lock elements within said groove;
 seal means in contact with said valve body, said bonnet closure and said lock elements; and
 vent means in combination with said means to retain said lock elements to selectively vent the interior of said valve body to the atmosphere without release of said lock elements.

22. The valve of claim 21, further including a support for said valve body adjacent said groove comprising a valve body wall thickness adjacent said groove and said access opening substantially the same as the thickness of the remainder of said valve body.

23. The valve of claim 21, wherein said seal means comprises packing material in contact with said valve body, said bonnet closure and said lock elements.

24. The valve of claim 21, wherein said means to retain said lock elements comprises adjacent lock elements having a concave and convex arcuate end contact surfaces retained to said valve bonnet closure by bolts whereby said arcuate end surfaces allow location of said lock elements in said groove substantially extending for the full extent of said annular groove.

25. The valve of claim 21, wherein said means to retain said lock elements comprises at least one lock element having end surfaces to contact adjacent lock elements which are substantially parallel and wherein said parallel end surfaces allow location in said groove of said lock elements substantially extending for the full extent of said annular groove.

26. The valve of claim 25, wherein said said lock elements are retained in said groove by vent tubes releasably secured to said bonnet closure adjacent said lock elements.

27. The valve of claim 21, wherein said means to retain said lock elements comprises at least one clock element having end surfaces to contact adjacent lock element segments which converge in a radially outward direction which allow location of said segments in said groove substantially extnding for the full extent of said annular groove.

* * * * *